(12) United States Patent
Sawyer (10) Patent No.: US 7,987,443 B2
(45) Date of Patent: Jul. 26, 2011

(54) DECLARATIVE ASSOCIATION OF DIALOG FIELDS

(75) Inventor: Jon R. Sawyer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 697 days.

(21) Appl. No.: 11/590,705

(22) Filed: Oct. 30, 2006

(65) Prior Publication Data

US 2008/0104540 A1    May 1, 2008

(51) Int. Cl.
  *G06F 9/44* (2006.01)
(52) U.S. Cl. ........................ 717/100; 717/106
(58) Field of Classification Search .................. 717/100, 717/106
  See application file for complete search history.

(56) References Cited

U.S. PATENT DOCUMENTS

| | | | |
|---|---|---|---|
| 6,118,451 A * | 9/2000 | Alexander | 715/809 |
| 2004/0184412 A1 | 9/2004 | Stephenson et al. | |
| 2004/0189713 A1 | 9/2004 | Thames et al. | |
| 2005/0251551 A1 * | 11/2005 | Mitchell et al. | 709/203 |
| 2005/0289450 A1 * | 12/2005 | Bent et al. | 715/506 |
| 2006/0041431 A1 | 2/2006 | Maes | |
| 2007/0130205 A1 * | 6/2007 | Dengler et al. | 707/104.1 |

OTHER PUBLICATIONS

Anderson, "Build Flexible Uls With Ease", Visual Studio Magazine, Aug. 2003.
www.tomsawyer.com, Tom Sawyer Software Visualization, Java Edition, 2004.

* cited by examiner

*Primary Examiner* — Philip Wang (57) ABSTRACT

A computer-based user interface comprises a dialog control element for usage in creating a dialog. The dialog control element acts upon a data model containing an object defined by one or more properties and modifiable by one or more controls. The dialog control element can associate object properties with controls recursively whereby properties can contain objects which further contain properties.

20 Claims, 8 Drawing Sheets

DECLARATIVE ASSOCIATION OF DIALOG FIELDS

BACKGROUND OF THE INVENTION

Graphical user interface developers may frequently implement a dialog which represents the state of an object model. Conventionally, the implementation involves a great deal of programming to create the dialog and controls, populate the controls with the state of the object model, and transfer the dialog control state information back to the object model when the user has concluded the dialog interaction. The task usually entails a large amount of procedural programming, which tends to be repetitive, tedious, and error-prone.

SUMMARY

In accordance with an embodiment of a computer-based user interface, a dialog control element can be used for creating a dialog. The dialog control element acts upon a data model containing an object defined by one or more properties and modifiable by one or more controls. The dialog control element can associate object properties with controls recursively whereby properties can contain objects which further contain properties.

BRIEF DESCRIPTION OF THE DRAWINGS

Embodiments of the invention relating to both structure and method of operation may best be understood by referring to the following description and accompanying drawings.

DETAILED DESCRIPTION

User interfaces can be constructed and used to define various types of systems and entities. In several illustrative embodiments, a user interface can enable editing of the topology of a system or entity, and can enable a user to edit the properties of each object in the system or entity via property dialogs. Dialogs can be constructed using declarative association of dialog fields to populate the dialog with controls, initialize control settings to reflect the current state of the object's properties, implement interactions between controls, such as enabling certain controls when other controls are in a particular state or updating the contents of dependent controls when the independent controls are modified by the user. The control settings can be copied back into the object's properties when the dialog is processed. Interactions with a command stack enable the changes made to be undone and redone.

The illustrative user interface enables a developer or user to specify a mapping between object properties and specific controls in the dialog. A dialog control element and/or interface generator addresses details of the interaction, facilitating complex interactions.

An illustrative system and corresponding operating method uses declarative association of dialog fields with complex object properties to facilitate implementation of a dialog representing on object model state.

Using a declarative language, a graphical user interface developer can specify not only the layout of controls in a dialog window, but also the association of those controls with the object model properties that they represent. A dialog control element and/or related user interface creates the dialog and associated dialog controls, populates the controls with information from the object model, then transfers control state information back to the object model when the user completes the dialog. The illustrative dialog control element and/or user interface manages very complex object property types, including objects, vectors of objects, vectors of objects containing vectors of objects, and the like.

Figure 1A:
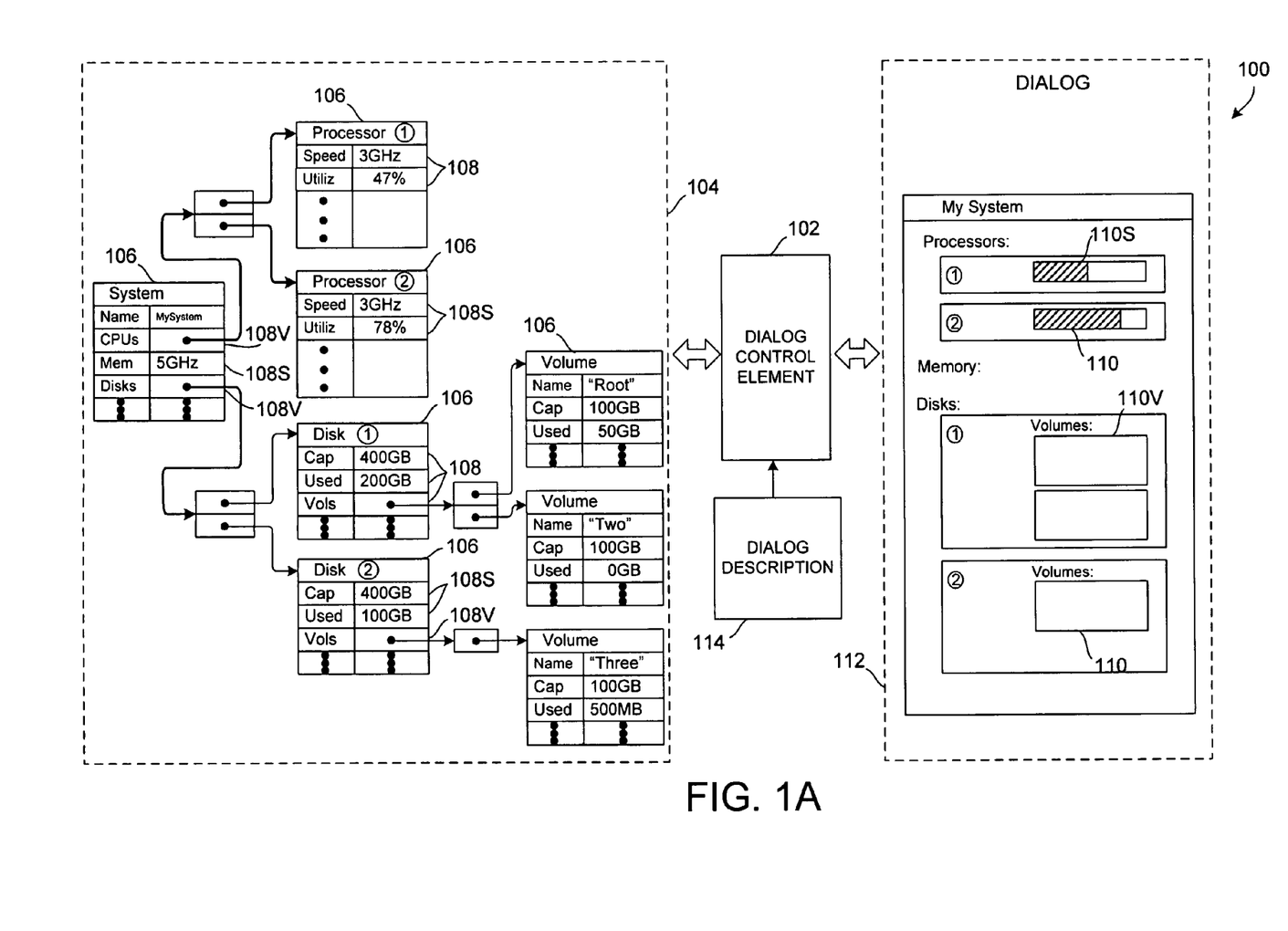
FIGS. 1A, 1B, and 1C are schematic block diagrams depicting an embodiment of a computer-based user interface that enables declarative association of dialog fields.
Figure 1B:
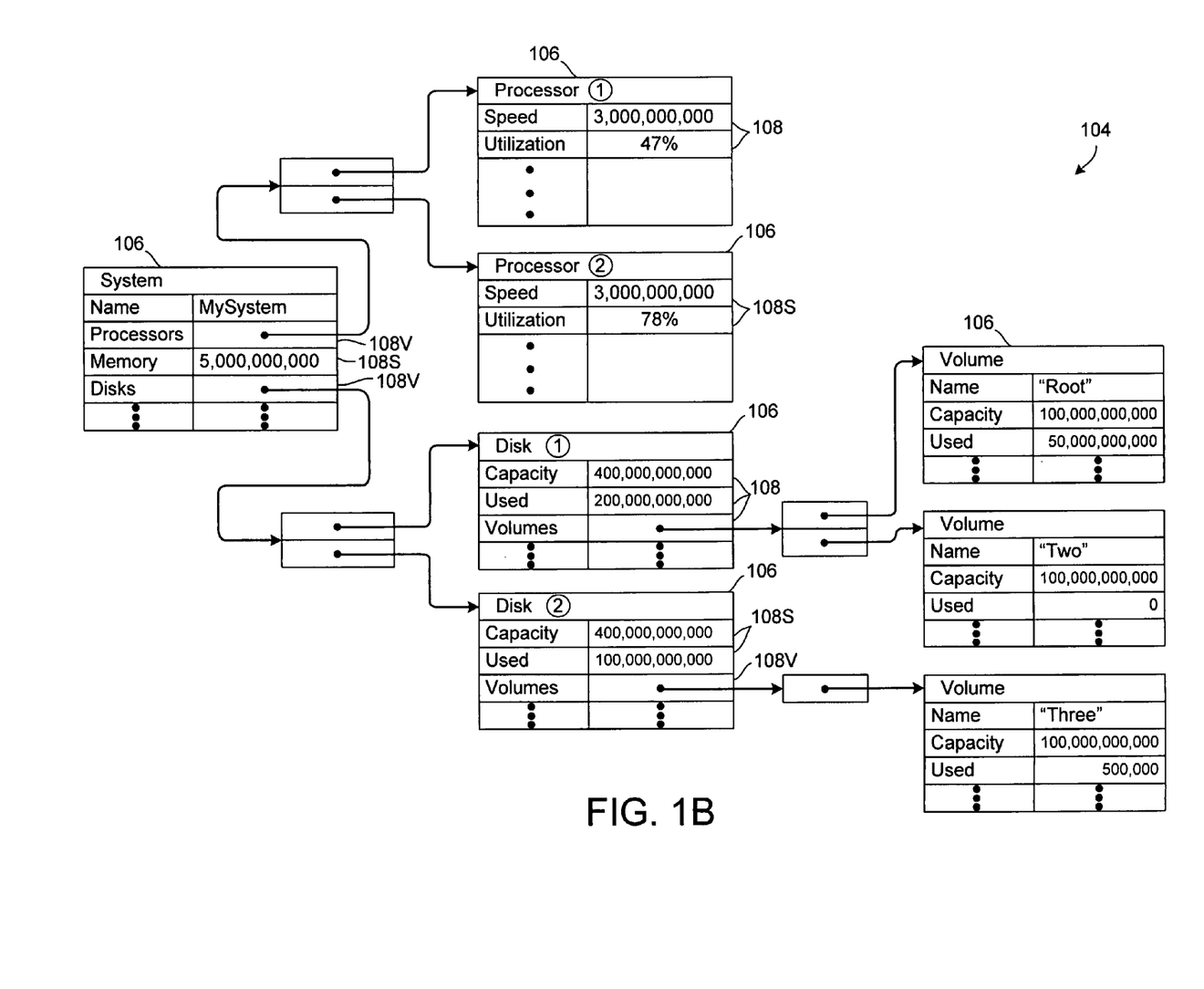
Figure 1C:
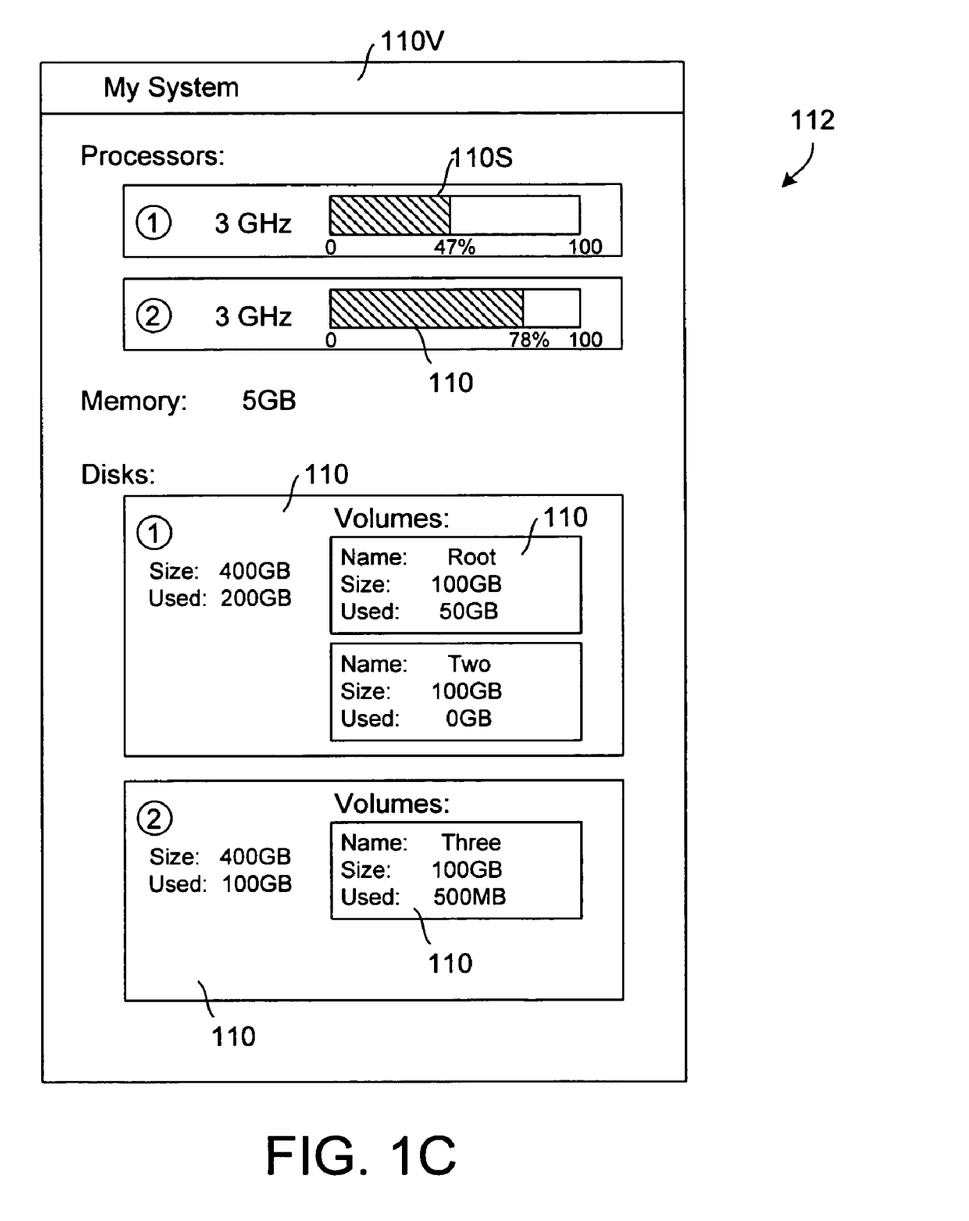

Referring to FIG. 1A in combination with FIGS. 1B and 1C, a schematic block diagram shows an embodiment of a computer-based user interface 100 that enables declarative association of dialog fields. The computer-based user interface 100 comprises a dialog control element 102 that can be used for creating a dialog 112. The dialog control element 102 acts upon a data model 104 containing an object 106 defined by one or more properties 108 and modifiable by one or more controls 110. The dialog control element 102 can associate object properties 108 with controls 110 recursively whereby properties can contain objects which further contain properties.

FIG. 1B illustrates the data model 104 and FIG. 1C shows the dialog 112 in higher detail than the user interface 100 shown in FIG. 1A. The data model 104 is a data structure that has objects. The objects have properties which may contain a scalar value or vector of properties or objects. A property may be a scalar reference to another object or may refer to a vector of objects. In the illustrative example, the dialog 112 and data model 104 relate to configuration by a user of a computer system in which objects 106 include components, elements, and/or aspects of a computer system such as processors, memory, storage devices, volumes of storage in the storage devices, and the like.

Objects can have properties of any suitable type, for example a scalar, a vector of scalar values, a single object such as a collection of related data, or a vector of objects.

A user or developer can create a dialog by supplying a declarative language to dialog control element 102 in the form of a description of the dialog desired by the developer. The description can include controls the user would like in the dialog 112 and a declarative association between the controls 110 and properties 108 in the data model 104 that the controls 110 represent. The user interface 100 can use a textual descriptive language including constraints that limit how a user reacts with data, information defining how to translate information from an internal format to a readable format, and translation information for returning entries back to a binary format for implementation in the model. The constraints are used by dialog control element 102 to define how to run dialog 112. The dialog control element 102 creates the dialog 112, creates controls 110, and positions controls 110 in the dialog 112 for example by selecting controls and defining the control layout according to information in description.

The dialog control element 102 copies information from the data model 104 into the dialog 112 for all controls 110, enabling recursive operation. For example, creating a textual description in the form of a template that can be duplicated to enable recursion. In the recursive operation, the dialog control element 102 accesses the data model 104, retrieves a template and repeats a dialog interaction for each object. For example, in the illustrative example the interaction can be repeated for each disk, creating a set of controls in the dialog which are used to present to the user values of properties such as space used, space available, and the like.

The recursive functionality enables operations on more complex objects, for example a two-level hierarchy. A complex model can be illustrated wherein a top level can be represented by an entire system in the dialog with a list of different virtual systems. Each virtual system can include a list of disks and processors, with each disk partitioned into different volumes. Further specificity can be defined, for example wherein each volume can list particular software. As the user changes values in controls, the dialog control element 102 creates controls for as many processors as exist in the data model 104 because dialog control element 102 operates upon the processor objects as a vector property that can be varied by user, thereby enabling the user to modify, for example add or delete, processors. The dialog control element 102 adds or removes additional controls that don't represent data in the model and modifies the dialog 112. The dialog control element 102 takes information in the dialog 112 and copies back the information to the data model 104 for each object. When components or elements are added or removed from the system in the dialog that modifies the model 104, the dialog control element creates or deletes structures in the data model 104 accordingly. When the interaction is complete, the dialog control element 102 destroys the dialog which is no longer in use.

The dialog control element 102 enables a description data structure that contains one control definition for each scalar property. For vector properties, the description data structures contain a "template description" that results in the creation of one control (or, for complex properties, one set of controls) for each element in the vector property at runtime. Functionality is recursive so that vector properties can contain objects which contain one or more vector properties containing objects, and so forth. Accordingly, an object can be defined by scalar properties 108S and vector properties 108V. The dialog control element 102 associates an individual scalar property with one control definition and associates an individual vector property with a template description. The association of properties 108 and controls 110 can be recursive whereby a property can contain an object that further contains at least one property.

The dialog control element 102 enables a declarative technique for creating a dialog description 114 and can typically be implemented as a textual description language. The declarative functionality of the dialog control element 102 enables definition of a syntax for the layout of controls in a dialog and enables the association of object property names with each control 110. In some embodiments, the dialog control element 102 can be configured for declarative creation of the dialog 112 through usage of a textual descriptive language enabling association object property names with individual controls.

The dialog control element 102 can function as a dialog engine that is constructed and provided as a runtime library, for example for use by application developers. An application developer that desires to create a dialog 112 links the library into an application and creates a dialog specification using the illustrative description functionality. Accordingly, in an example implementation the dialog control element 102 can function as a runtime library for linkage into an application, thereby creating a dialog specification.

During operation, the dialog control element 102 can be invoked by application code at runtime. Information including a dialog description 114 and a reference to an application object to which the dialog applies are supplied to the dialog control element 102 which creates the dialog 112 as specified by the dialog description 114. The dialog control element 102 creates as many copies of vector property template descriptions as are directed in the dialog process.

The dialog control element 102 populates the controls 110 with information from the application object by accessing the properties 108 designated by the dialog description 114 as being associated with the controls 110.

Once the dialog 112 is created and the controls 110 populated, a user can interact with the dialog 112. The user can modify scalar controls 110S and vector controls 110V. The user can add and/or remove objects 106 from a selected vector property 108V. As the user interacts with the dialog 112, the dialog control element 102 modifies information associated with creating and/or destroying controls 110. For example, as controls 110 are created, the dialog control element 102 creates any data structures, and creates any pointers for accessing the created data structures. In a particular embodiment, the dialog control element 102 creates and/or destroys objects in object properties to reflect any user additions and/or removals of objects from a vector control.

When the user concludes the dialog 112, the dialog control element 102 copies state information from the dialog 112 back into the data model 104 associated with the application object. The dialog control element 102 creates and/or destroys objects in object properties to reflect user addition and/or removal of objects from a vector control.

For purposes of example only, FIGS. 1A, 1B, and 1C illustrate a data model 104 wherein a high-level object 106 is a system, such as a computer that has various properties 108 including processor speed, memory size, cache size, rotational speed, and disk objects. The disk objects, for example, can be modeled as a vector array of disk objects. In the illustrative data model 104, controls 110 can represent processor speed as a bar graph, or the dialog can have a table that represents a disk.

The dialog control element 102 can be implemented as computer program that copies information in the data structure of the model 104 into the dialog 112 and the controls 110 for the dialog.

The user interface 100 can be implemented for declarative operation whereby a user or developer can use a dialog control element 102, once created, for construction of another system or application to create a dialog instead of the tedious and time consuming writing lines of code to translate properties into human readable form and copying into files that are inherent in an imperative or programming functionality. The imperative or programming functionality is implemented with linear program code, typically in a serial structure with decision processes implemented with branches and loops, with program code written for each operation step. In contrast, declarative functionality is based on association of fields in the dialog with instructions in a data structure.

Referring to FIGS. 2A through 2E, a set of flow charts illustrates one or more embodiments of a method for associating dialog fields with represented object model properties. In various embodiments, configurations, and according to various perspectives, the illustrative method and/or methods can be considered to refer to actions performed by any suitable actor, including a user that operates upon a dialog, an executable program code that executes one or more dialog handling function, a dialog control element program, a computer-based user interface generator, or other program code. The method can also be considered to be performed by a system, such as a computer system, data processing system, or other system that executes the illustrative programs or user interfaces.

Figure 2A:
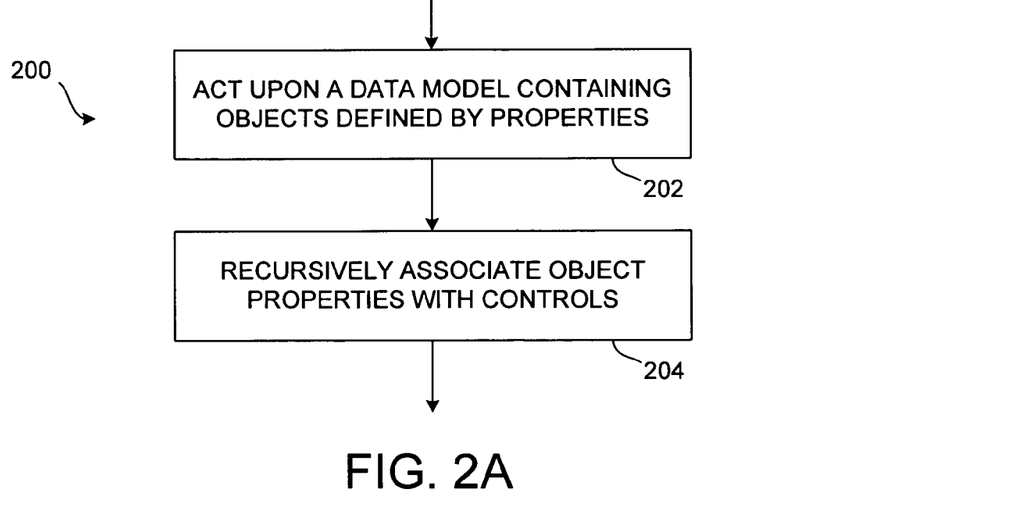
FIGS. 2A through 2E are a set of flow charts illustrating one or more embodiments of a method for associating dialog fields with represented object model properties.

Referring to FIG. 2A, the method 200 comprises acting 202 upon a data model that contains one or more objects defined by one or more properties for a data model that is modified by at least one control. Object properties are associated 204 with controls recursively whereby properties can contain objects which further contain properties.

Figure 2B:
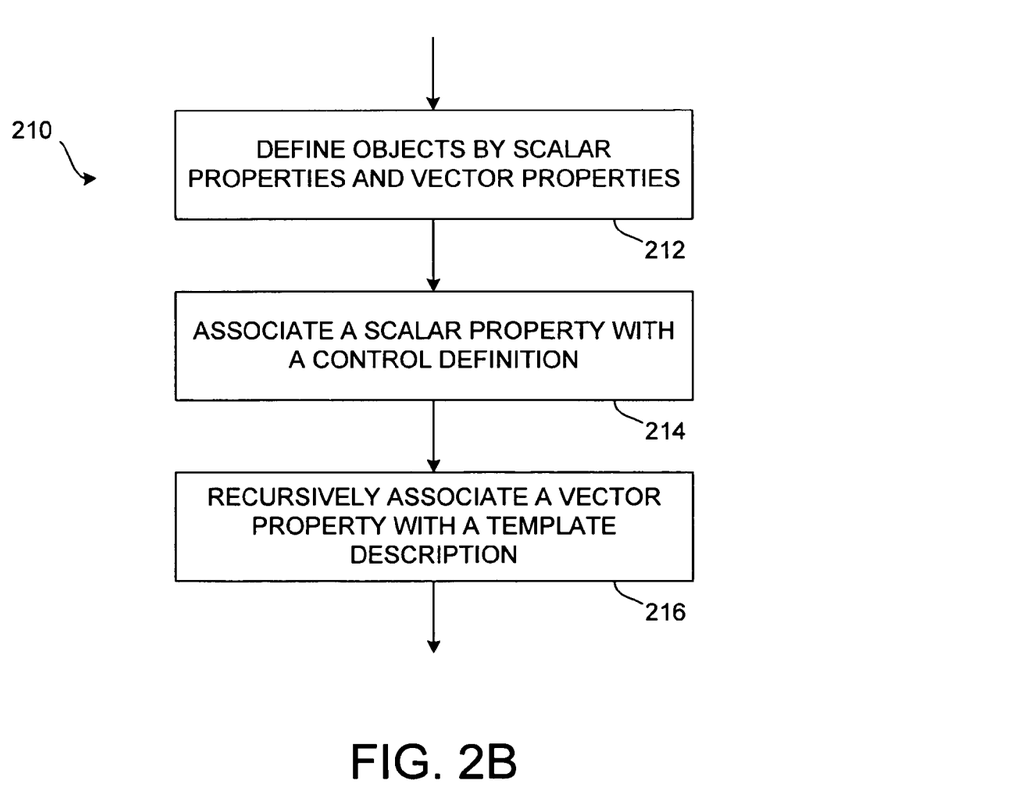

Referring to FIG. 2B, an embodiment of a method 210 for associating dialog fields with represented object model properties can further comprise defining 212 the one or more objects by scalar properties and vector properties. Individual scalar properties are associated 214 with one control definition. Individual vector properties are recursively associated 216 with a template description whereby a property can contain an object that further contains at least one property.

In some embodiments, the dialog can be declaratively defined in a textual descriptive language that associates object property names with individual controls.

Figure 2C:
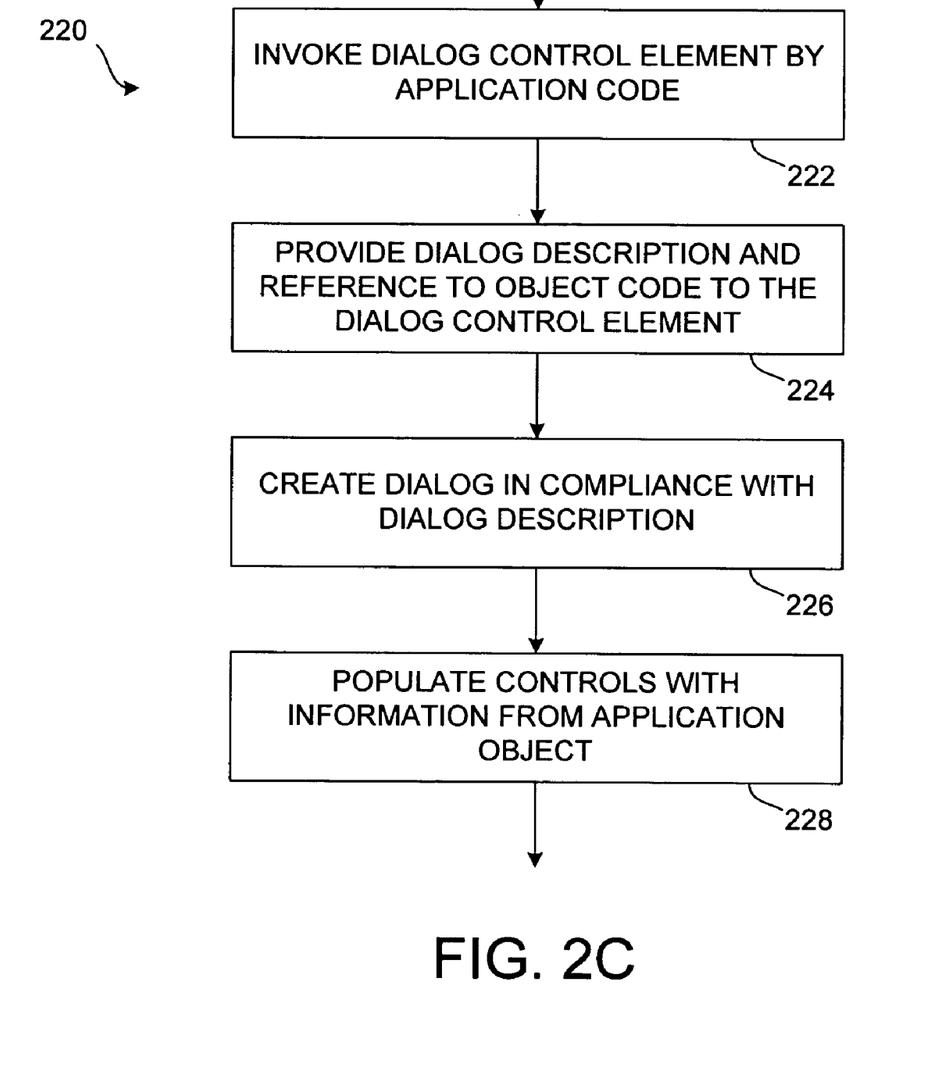

Referring to FIG. 2C, an embodiment of a method 220 for associating dialog fields with represented object model properties can comprise actions occurring at runtime. A dialog control element is invoked 222 by application code and a dialog description and reference to an object code to which the dialog applies are provided 224. The dialog is created 226 in compliance with the dialog description by creating as many copies of control template descriptions as are directed according to the dialog description. The controls are populated 228 with information from the application object by accessing the properties designated by the dialog description as being associated with the controls.

Figure 2D:
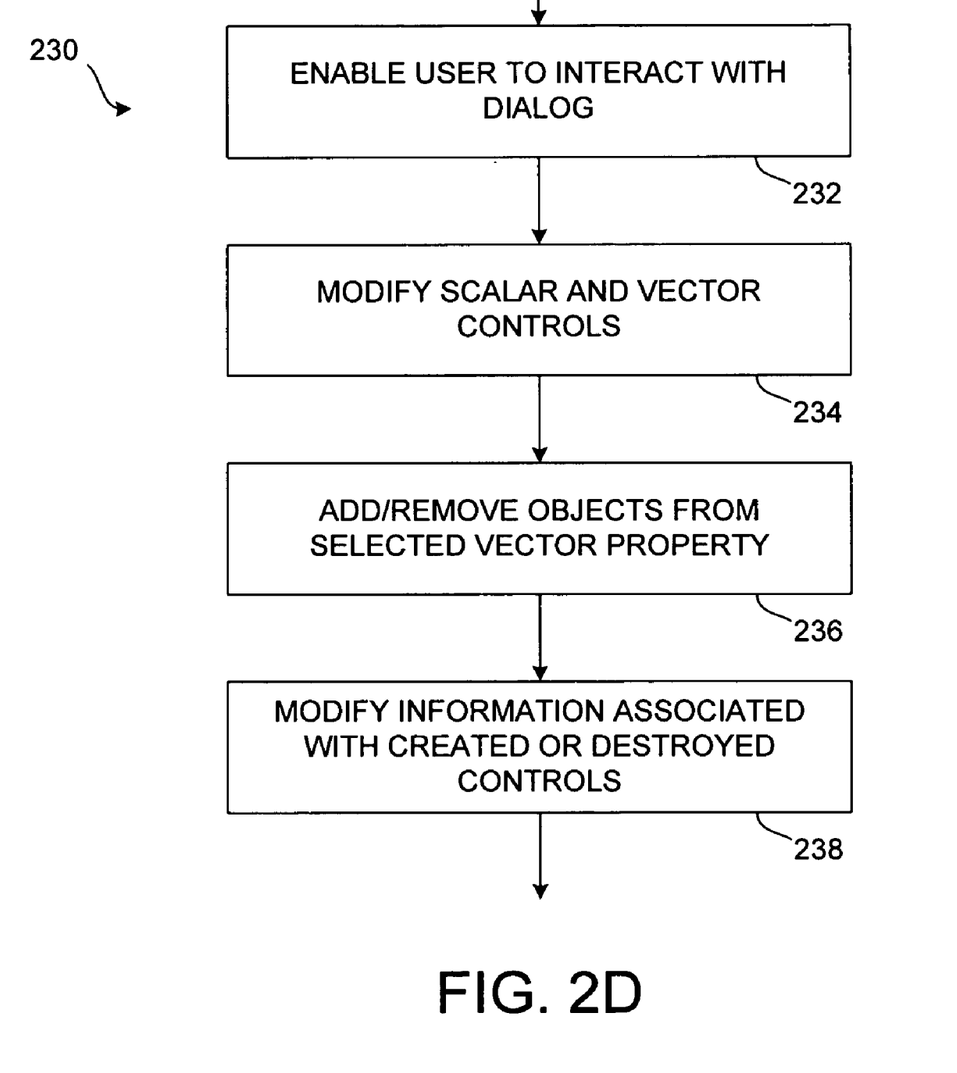

Referring to FIG. 2D, a further embodiment method 230 adapted for declarative association of dialog fields can comprise enabling 232 a user to interact with the dialog or, for a user, interacting with the dialog. An interaction with the dialog can comprise modifying 234 the scalar controls and vector controls, and adding and/or removing 236 objects from a selected vector property. Information associated with creating and/or destroying controls in the dialog can be modified based on the user interaction.

Figure 2E:
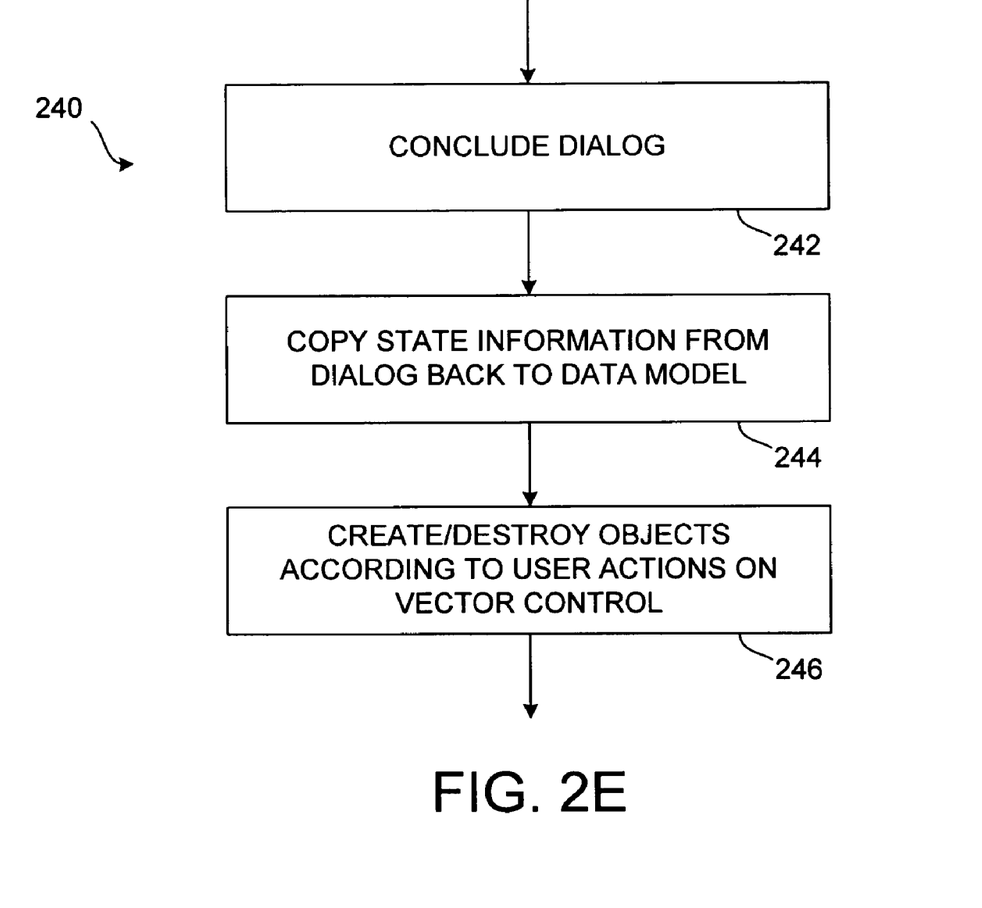

Referring to FIG. 2E, a further embodiment method 240 adapted for declarative association of dialog fields at conclusion 242 of the dialog. State information is copied 244 from the dialog back into the data model associated with the application object in response to conclusion of the user interaction. Objects in object properties are created and/or destroyed 246 to reflect user addition and/or removal of objects from a vector control.

Figure 3:
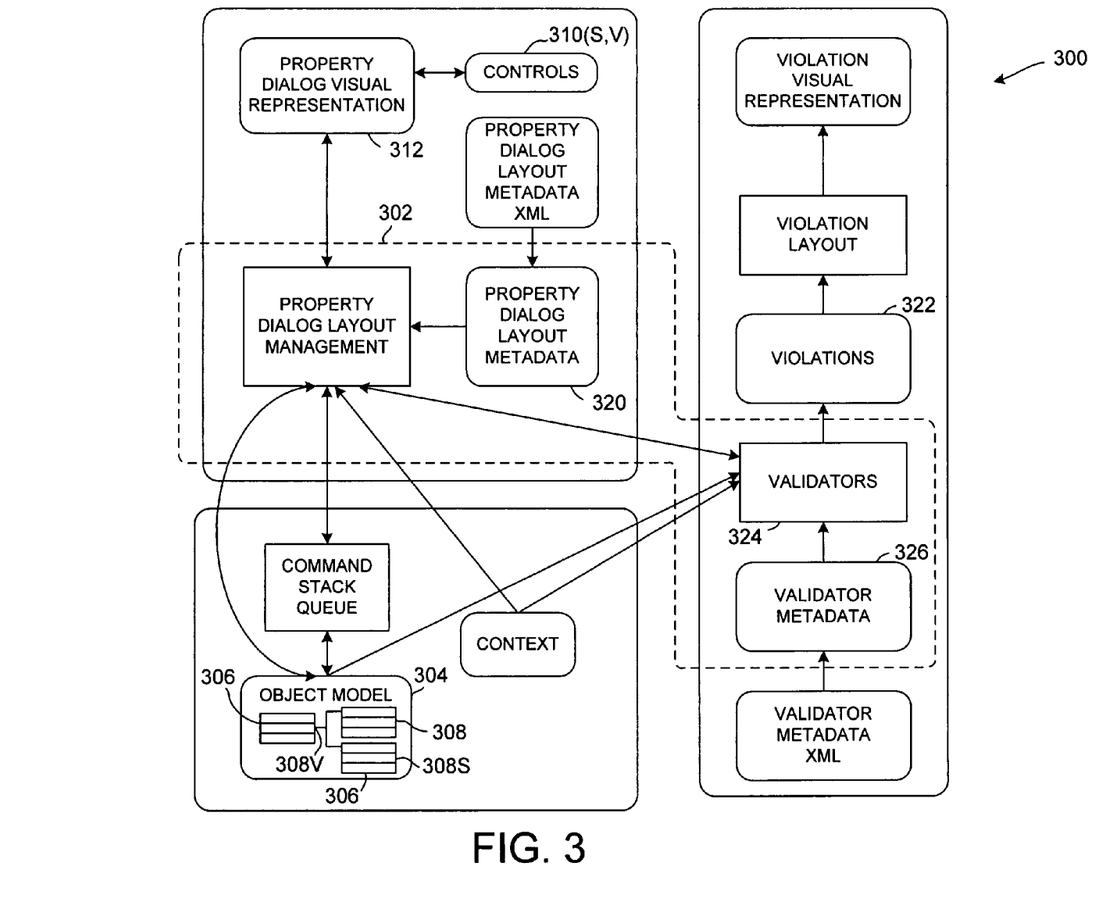
FIG. 3 is a schematic architectural block diagram showing an embodiment of a system which is adapted to enable declarative association of dialog fields with complex object properties.

Referring to FIG. 3, a schematic architectural block diagram depicts an embodiment of a system 300 adapted to enable declarative association of dialog fields with complex object properties. The system 300 comprises a computer-based user interface generator 302 that enables a developer to implement a dialog 312 representing a state of an object model 304 using a declarative language. The interface generator 302 creates a dialog 312 and controls 310 for the dialog 312 and populates the controls 310 with information from the object model 304. The interface generator 302 associates object properties 308 with the controls 310 recursively whereby properties can contain objects which further contain properties. The interface generator 302 transfers control state information back to the object model 304 when the developer completes the dialog 312.

The architectural block diagram depicted in FIG. 3 shows a view side including components used to present information to a human, specifically the dialog 312 and controls 310. In some configurations, the controls 310 can mostly be scalar controls 310S such as drop-down lists, date selections, color selections, or more complex fields which still correspond to one scalar property. Some controls 310V represent vectors, for example using a list of controls that represent a vector.

The interface generator 302 associates object properties 308 with controls 310 including both scalar properties and vector properties. A scalar property is associated with a corresponding control definition and a vector property is associated with a corresponding set of controls according to a template description.

At runtime, the interface generator 302 functions as a dialog engine that is invoked by application code and given the dialog description as well as a reference to the application object to which the dialog applies. The dialog engine creates the dialog 312 according to the description, including creating as many copies of vector property template descriptions as are appropriate to the dialog and interaction.

The dialog engine then populates the dialog controls 310 with information from the specified application object 306 by accessing the properties 308 named in the dialog description as being associated with the controls 310.

The user is then allowed to interact with the dialog 312. In addition to the ability to modify the contents of scalar and vector controls 310, the user may also be granted the ability to change the number of objects 306 in a vector property. The granting of this ability is controlled by settings in the dialog description. As the user chooses to add or remove objects 306 in a vector property, the dialog engine takes care of the details of creating or destroying the necessary controls in the dialog 312.

When the user concludes interacting with the dialog 312, typically by performing an "OK" action, the dialog engine copies the state information from the dialog 312 back into the application object model 304. If the user has added or removed objects from a vector control 310V, the dialog engine creates or destroys objects 306 in the object's property, as appropriate, to reflect the changes made by the user.

The mapping of object properties to dialog controls can be implemented via a metadata configuration file 320.

The illustrative interface generator 302 can be subject to some design rule constraints 322 that control how the system can be constructed. Some design rules can be checked during the construction of the system.

The interface generator 302 can also manage validators by invoking an appropriate number of validators for defined constraints. A validator checks to determine whether a user entry violates any ground rules of the program as part of the declarative description.

Validation code can be encapsulated in validator objects 324 that enable validation code to be run on either client or server systems. Validation can be run after any change to the system through the dialog interaction, enabling the user to be notified as soon as possible after a violation of design rules via information conveyed to the user through the use of a violation browser window.

In addition to a role as informers, the validation framework can be used to correct simple self-consistency problems and can be addressed independently of user action or notification, although notification can be included, if desired. For example, when a device is deleted from an entity, the device is removed from the list of devices on the object corresponding to the entity. However, that device may still be referenced in other places, such as a default gateway property of another device. A validation rule can remove such stale references without user notification, since the implemented behavior is no more or less than expected. Accordingly, validation avoids manual search and handling of stale references.

Various generic validator objects can be supplied for reusage in common validation tasks. For example, a String- LengthValidator object can be used wherever the length of a string is to be verified. Generic validators can be configurable through metadata 326 in the manner of other aspects of an editor. Generic validators facilitate common validation. In addition, for uncommon validation tasks, the developer can maintain an ability to include procedural code to perform arbitrary validation functions.

The illustrative dialog control element, interface generator, and methods allows controls for a dialog to be specified declaratively, associating the controls with properties of application object properties, yet gives the application dialog programmer the flexibility to lay out the dialog in a more functional, usable, and pleasing layout than a simple "property, value" columnar layout.

Also, the described dialog control element, interface generator, and associated methods enable the declarative specification of dialogs that allow the modification of complex object properties, such as vectors of objects that contain vectors of objects that contain vectors of objects. Furthermore, in addition to simply modifying the existing values of such properties, the user is enabled to modify the structure of the properties, for example, adding and removing objects from the vector properties.

In a conventional dialog interaction, an application programmer writes a large amount of application-specific, procedural code to implement the dynamic changes to the dialog. In contrast, the structures and methods described herein enable deployment of a reusable library that implements the functionality and allows the application programmer to use of the functionality by simply writing a dialog description.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of dialogs and data models are described. The illustrative system for declarative association of dialog fields can be used with any suitable dialogs or data models. The illustrative techniques may be used with any suitable data processing configuration and with any suitable servers, computers, and devices.

What is claimed is:

1. A computer-based user interface comprising:
   a dialog control element that executes on a computer for usage in creating a dialog, configured to receive and act upon a data model containing recursive data structures comprising at least one object defined by at least one property and modifiable by at least one control, the dialog control element further configured to associate object properties with controls recursively whereby properties contain objects which further contain properties and responsive to a user request to modify objects by modifying user interface controls and modifying portions of the recursive data structure to reflect object modifications, wherein the dialog control element performs recursive operations by retrieving a template and repeats a dialog interaction for object properties contained in the at least one object and creates at least one control recursively corresponding to the object properties and the template.

2. The computer-based user interface according to claim 1 wherein:
   the at least one object is defined by scalar properties and vector properties; and
   the dialog control element associates an individual scalar property with one control definition, and associates an individual vector property with a template description, the association being recursive wherein a property contains an object that further contains at least one property and a user request to modify objects modifies user interface controls and modifies portions of the recursive data structure to reflect object modifications.

3. The computer-based user interface according to claim 1 wherein:
   the dialog control element is configured for declarative creation of the dialog in a textual descriptive language for associating object property names with individual controls.

4. The computer-based user interface according to claim 1 wherein:
   the dialog control element is configured as a runtime library for linkage into an application, creating a dialog specification.

5. The computer-based user interface according to claim 1 wherein:
   the dialog control element is configured to be invoked by application code at runtime and responsive to a provided dialog description and reference to an application object to which the dialog applies, and the dialog control element is configured to create the dialog according to the dialog description including creating as many copies of vector property template descriptions as are directed according to the dialog.

6. The computer-based user interface according to claim 5 wherein:
the dialog control element is configured for populating the controls with information from the application object by accessing the properties designated by the dialog description as being associated with the controls.

7. The computer-based user interface according to claim 6 wherein:
the dialog control element is configured for enabling a user to interact with the dialog, the interactions comprising modifying the scalar controls and vector controls, and adding and/or removing deleting objects from a selected vector property respectively adds and deletes user interface controls and respectively creates and deletes portions of the recursive data structure.

8. The computer-based user interface according to claim 7 wherein:
the dialog control element is configured for modifying information associated with creating and/or destroying controls in the dialog according to the user interaction.

9. The computer-based user interface according to claim 8 wherein:
the dialog control element is configured for creating and/or destroying objects in object properties in reflection of user addition and/or removal of objects from a vector control.

10. The computer-based user interface according to claim 9 wherein:
the dialog control element is configured for copying state information from the dialog back into the data model associated with the application object in response to conclusion of the user interaction; and
the dialog control element is configured for creating and/or destroying objects in object properties in reflection of user addition and/or removal of objects from a vector control.

11. A method of associating dialog fields of a user interface of a computer with represented object model properties comprising:
acting upon a recursive data structure containing at least one object defined by at least one property and modifiable by at least one control;
associating object properties with controls recursively whereby properties can contain objects which further contain properties; and
responding to a user request to modify objects by modifying user interface controls and modifying portions of the recursive data structure to reflect object modifications, wherein the associating object properties with controls performs recursive operations by retrieving a template and repeats a dialog interaction for object properties contained in the recursive data structure and creates at least one control recursively corresponding to the object properties and the template.

12. The method according to claim 11 further comprising:
defining the at least one object by scalar properties and vector properties;
associating an individual scalar property with one control definition;
recursively associating an individual vector property with a template description whereby a property can contain an object that further contains at least one property; and
declaratively defining the dialog in a textual descriptive language for associating object property names with individual controls.

13. The method according to claim 11 further comprising:
invoking a dialog by application code at runtime;
providing a dialog description and reference to an application object to which the dialog applies;
creating the dialog according to the dialog description comprising creating as many copies of control template descriptions as are directed according to the dialog; and
populating the controls with information from the application object by accessing the properties designated by the dialog description as being associated with the controls.

14. The method according to claim 13 further comprising:
enabling a user to interact with the dialog;
interacting with the dialog comprising modifying the scalar controls and vector controls, and adding and/or removing objects from a selected vector property; and
modifying information associated with creating and/or destroying controls in the dialog according to the user interaction.

15. The method according to claim 14 further comprising:
concluding a user interaction;
copying state information from the dialog back into the recursive data structure associated with the application object in response to conclusion of the user interaction; and
creating and/or destroying objects in object properties in reflection of user addition and/or removal of objects from a vector control.

16. A system comprising:
a computer-based user interface generator that executes on a computer and enables a developer to implement a dialog representing a state of an object model using a declarative language, the interface generator configured to create a dialog and controls for the dialog, populate the controls with information from the object model, associate object properties with controls recursively in a recursive data structure whereby properties contain objects which further contain properties, and, in response to a user request to modify objects, modify both user interface controls and portions of the recursive data structure, and transfer control state information back to the object model when the developer completes the dialog, wherein the interface generator performs recursive operations by retrieving a template and repeats a dialog interaction for object properties contained in the recursive data structure and creates at least one control recursively corresponding to the object properties and the template.

17. The system according to claim 16 wherein:
the interface generator is configured to associate object properties with controls including scalar properties and vector properties whereby a scalar property is associated with a corresponding control definition and a vector property is associated with a corresponding set of controls according to a template description.

18. The system according to claim 17 wherein:
the interface generator is configured to be invoked by application code at runtime and responsive to a provided dialog description and reference to an application object to which the dialog applies, the interface generator configured to create the dialog according to the dialog description including creating as many copies of vector property template descriptions as are directed according to the dialog.

19. The system according to claim 18 wherein:
the interface generator is configured for:
populating the controls with information from the application object by accessing the properties designated by the dialog description as being associated with the controls;
enabling a user to interact with the dialog, the interactions comprising modifying the scalar controls and vector controls, and adding and/or removing objects from a selected vector property;
modifying information associated with creating and/or destroying controls in the dialog according to the user interaction;
creating and/or destroying objects in object properties in reflection of user addition and/or removal of objects from a vector control;
copying state information from the dialog back into the data model associated with the application object in response to conclusion of the user interaction; and
creating and/or destroying objects in object properties in reflection of user addition and/or removal of objects from a vector control.

20. An article of manufacture comprising:
a computer-readable medium having a program code embodied therein for associating dialog fields with represented object model properties comprising, the program code further comprising:
a code adapted to cause a controller to act upon a recursive data structure containing at least one object defined by at least one property and modifiable by at least one control;
a code adapted to cause the controller to associate object properties with controls recursively whereby properties can contain objects which further contain properties; and
a code adapted to cause the controller to respond to a user request to modify objects by modifying user interface controls and modifying portions of the recursive data structure to reflect object modifications, wherein the controller performs recursive operations by retrieving a template and repeats a dialog interaction for object properties contained in the recursive data structure and creates at least one control recursively corresponding to the object properties and the template.

* * * * *